United States Patent Office.

CHARLES A. SEELY, OF NEW YORK, N. Y.

Letters Patent No. 84,219, dated November 17, 1868.

IMPROVEMENT IN THE MANUFACTURE OF GAS FROM VOLATILE LIQUIDS.

The Schedule referred to in these Letters Patent and making part of the same.

*To all whom it may concern:*

Be it known that I, CHARLES A. SEELY, of the city, county, and State of New York, have invented a new and improved Mode of Generating Gas from Light Naphthas and other Combustible Volatile Liquids; and I do hereby declare that the following is a full and exact description thereof.

The nature of my invention consists in subjecting the volatile liquid contained in a proper closed receptacle to the heat of hot water, when thereby the volatile liquid is in part converted into a gas or vapor, which latter is led by suitable conducting-pipes to the burner or burners.

As the volatilization of the liquid is to be effected by water at a temperature of about 212° Fahrenheit, it is evident that my invention is applicable only to liquids, such as gasolines, ethers, and spirits, which have a boiling-point below that of water.

To enable others skilled in the art to make and use my invention, I will proceed to describe its construction and operation.

I construct my generator or boiler of metal, and for strength and simplicity I prefer to have it in the form of a cylinder, one or two diameters high, or in the form of a sphere. The generator must be made capable of bearing a pretty high pressure.

I have found that gasoline of 90° Baumé, when confined and heated to a temperature of 212° Fahrenheit, exerts a pressure of about seventy-five pounds to the square inch. The generator is provided with means for supplying it with the volatile liquid, and for the escape of the gas for use. The first may be a simple opening, provided with a closely-fitting plug; the latter must be a pipe provided with a stop-cock for shutting off and regulating the flow of gas.

When the generator is charged with liquid, I bring it in contact with hot water or steam, and as soon as the volatile liquid becomes heated, vapor or gas is formed, which may be led away by the conducting-pipe to the burner, and the generation of the gas continues as long as the gas is consumed, until the liquid is exhausted.

A convenient way of applying the hot water is to immerse the generator in a kettle or other vessel containing hot water. The heat of the water may be maintained by a gas-flame or other fire kept burning under the kettle, by a jet of live steam issuing under the water, or by a heating-coil leading out of and returning into the water, by a coil of pipe surrounding the generator and filled with hot water. The proper heat may also be given to the generator by surrounding it with a hot-water or steam-jacket, or a circulating coil for water or steam, partly enclosed in the generator. In all these cases, I use the water or steam simply as a medium for conveying and controlling the heat which is needed for the generation of the vapor for lighting and heating-purposes, and I do not limit myself to any of the modes of applying the medium.

My invention consists in using hot water as a heating-medium in the generation of gas or vapor for lighting and heating-purposes, together with the appliances and combinations, herein described, requisite for the successful carrying out of the process.

When the gas generated by my process is to be conveyed to a considerable distance from the generator, I provide, when necessary, against the condensation of the vapor in the conducting-pipe, by surrounding the pipe with a non-conducting covering, or by keeping it warm by hot water, steam, or the direct heat of a fire.

In my process, the hot water serves first to generate the gas or vapor, and next to maintain a constant tension. The tension being dependent upon the temperature of the water, which may readily be kept constant, I am enabled to dispense with all other regulators of pressure.

What I claim as my invention, and desire to secure by Letters Patent, is—

1. The process of generating a gas or vapor of high tension, for lighting and heating-purposes, as described.

2. The combination of the generator and the pipes or other receptacles containing hot water, as described.

3. The combination of the generator with the escape-pipe and stop-cock, as described.

4. The prevention of condensation in the gas-conducting pipes, substantially as described.

CHARLES A. SEELY.

Witnesses:
 G. M. KLYMPTON,
 EDM. F. BROWN.